No. 822,617. PATENTED JUNE 5, 1906.
S. G. LOHR.
CORN PLANTER.
APPLICATION FILED OCT. 28, 1905.

2 SHEETS—SHEET 1.

Witnesses:
Wm E Thompson
Stella Snider

Inventor:
S. G. Lohr,
by E. T. Silvius,
Attorney.

No. 822,617. PATENTED JUNE 5, 1906.
S. G. LOHR.
CORN PLANTER.
APPLICATION FILED OCT. 28, 1905.

2 SHEETS—SHEET 2.

Witnesses:
W. T. Thompson
Stella Snider.

Inventor:
S. G. Lohr,
by E. T. Silvius,
Attorney.

UNITED STATES PATENT OFFICE.

SOLOMON GRANT LOHR, OF WASHINGTON TOWNSHIP, HAMILTON COUNTY, INDIANA.

CORN-PLANTER.

No. 822,617.　　　Specification of Letters Patent.　　　Patented June 5, 1906.

Application filed October 28, 1905. Serial No. 284,787.

To all whom it may concern:

Be it known that I, SOLOMON GRANT LOHR, a citizen of the United States, residing in Washington township, in the county of Hamilton and State of Indiana, have invented new and useful Improvements in Corn-Planters; and I do declare the following to be a full, clear, and exact description of the invention, reference being had to the accompanying drawings, and to the letters of reference marked thereon, which form a part of this specification.

The invention has reference to horse-power machines for planting corn or other seed grain in rows either drilled or check-rowed, and the invention has particular reference to the means for opening the furrow and dropping the grains therein, especially for planting in check-rows.

Objects of the invention are to provide simple and relatively inexpensive mechanism in corn-planters for planting in check-rows without requiring the intricate and somewhat troublesome check-row mechanism and line-wires heretofore generally employed and to provide durable and economical check-row mechanism which may be adapted to be employed in drilling seed into the ground.

With the above-mentioned and minor objects in view the invention consists in improved dropping mechanism for corn-planters comprising seed-guides and droppers connected with the seedboxes, the latter having seed-measuring devices therein, wheels mounted on the seed-guides for opening the furrows and operating the seed measuring and dropping devices to drop the seed, and mechanism between the wheels and the seed measuring and dropping devices; and the invention consists, further, in the novel parts and the combinations and arrangements of parts, as hereinafter particularly described and claimed.

Figure 1:
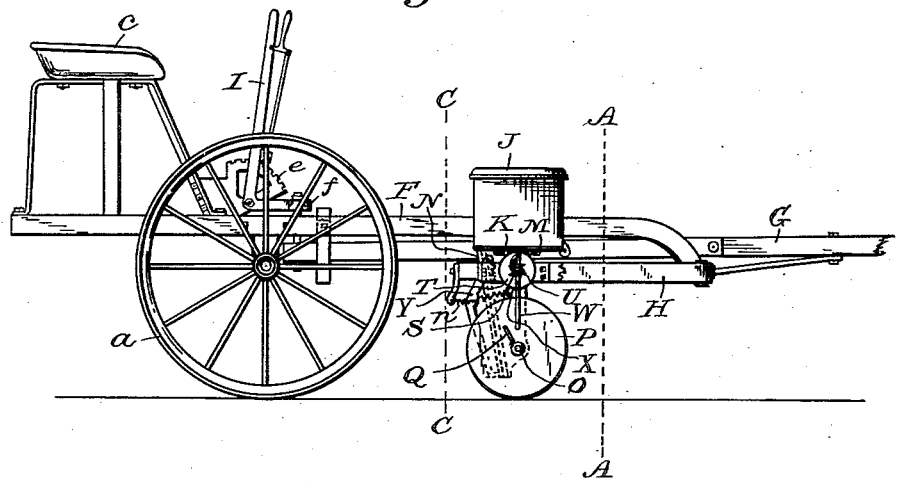
Figure 2:
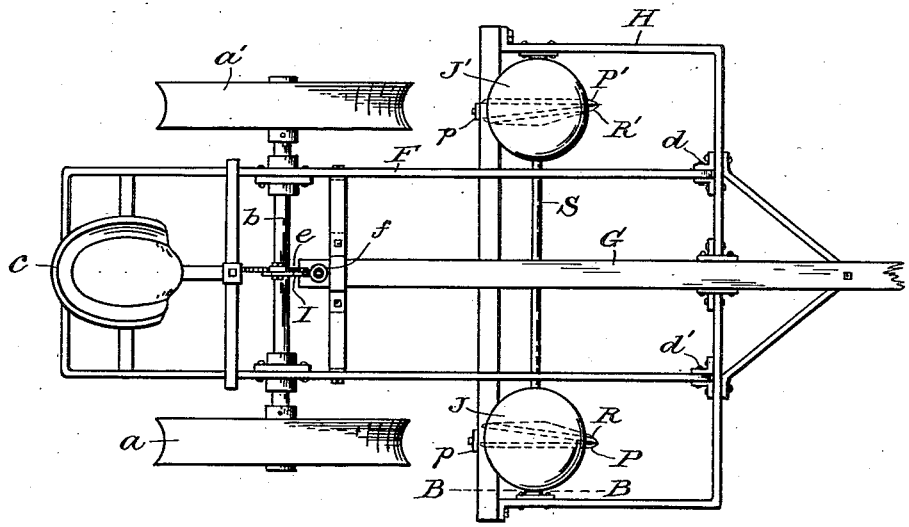
Figure 3:
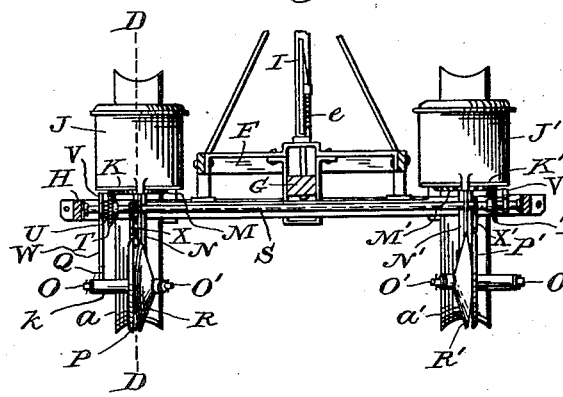
Figure 4:
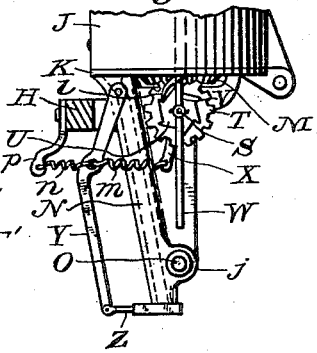
Figure 5:
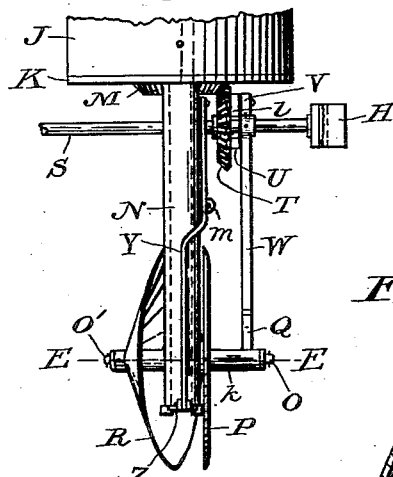
Figure 6:
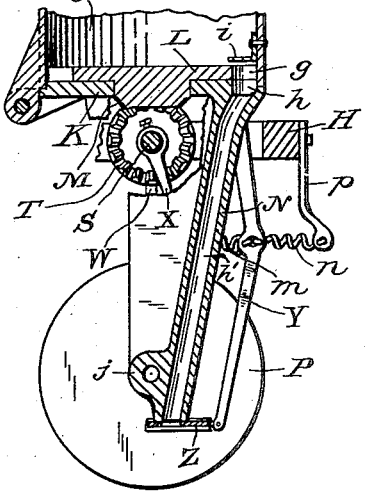
Figure 7:
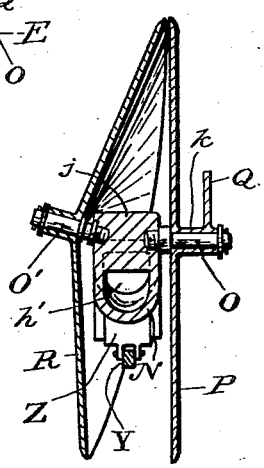
Figure 8:
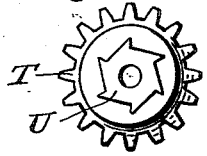
Figure 9:
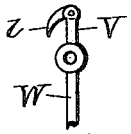

Referring to the drawings, Figure 1 is a side elevation of a corn-planter constructed substantially in accordance with the invention; Fig. 2, a top plan thereof; Fig. 3, a transverse vertical sectional view thereof on the line A A in Fig. 1; Fig. 4, a fragmentary side elevation of portions of the improvement as viewed at the line B B in Fig. 2; Fig. 5, a fragmentary rear elevation of portions of the improvement as viewed at the line C C in Fig. 1; Fig. 6, a fragmentary vertical sectional view approximately on the line D D in Fig. 3; Fig. 7, a horizontal sectional view on the line E E in Fig. 5; and Figs. 8 and 9 detached parts of the dropping mechanism.

Similar reference characters in the several figures of the drawings designate corresponding elements or features.

In the drawings, $a$ and $a'$ designate the carrying-wheels of the corn-planter, the wheels being designed to cover the deposited corn; $b$, the axle for the wheels; $c$, the driver's seat; F, the rear frame that is mounted on the axle and supports the seat; G, the tongue for guiding the machine; H, the forward or runner frame that is attached to the tongue and connected by pivots $d$ and $d'$ to the rear frame; I, the lever operating in connection with a quadrant $e$ and having an arm $f$ connected with the rear end of the tongue G for elevating or depressing the rear end of the forward frame H, and thereby the wheels that effect operation of the seed-dropping mechanism. The above-mentioned elements may be variously constructed in detail.

In practically carrying out the invention a pair of seedboxes J and J' of suitable construction are mounted suitably on the forward frame H and have apertured bottoms K and K', respectively. A seed-plate L of suitable construction is mounted rotatively on the bottom of each seedbox and has a suitable number of seed-pockets $g$ therein, the seed-plates having bevel gear-wheels M and M' attached thereto that are arranged beneath the seedbox-bottoms, the latter having each an aperture $h$ therein, through which the seeds may drop from the pockets $g$ when a pocket is opposite the aperture, there being a cover or cut-off $i$ attached to the seedbox above the seed-plate L above the aperture $h$ to prevent seeds from entering a pocket $g$ while the measured seeds may be dropping therefrom through the aperture $h$. Seed-guides N and N' are attached to the bottoms of the seedboxes and have each a channel $h'$ communicating with the aperture $h$ of the bottom of the seedbox. The seed-guides extend downwardly a suitable distance, so as to approach the ground for guiding the seeds to the furrow, and each one is provided with a boss $j$, that supports a stud-axle O at one side and a stud-axle O' at the opposite side of the seed-guide. The stud-axle O projects laterally with its axis parallel to the axle $b$, and the axis of the stud-axle $O'$ is inclined forwardly to the axis of the other stud-axle. A disk-shape wheel P is mounted rotatively on the stud-axle O, and a trip-arm Q is attached to the hub $k$ of the wheel, although the trip-arm may be attached directly to the wheel, if desired. A conically-dished disk R is mounted on the stud-axle $O'$. A wheel $P'$ and a disk $R'$ are mounted on the stud-axles of the seed-guide $N'$.

A rock-shaft S is mounted horizontally in the frame H, and two bevel gear-wheels T and $T'$ are mounted rotatively thereon and mesh with the gear-wheels M and $M'$ for operating the seed-plates. A ratchet-wheel U is attached to each wheel T and $T'$ for the operation thereof intermittently. Arms V and $V'$ are attached to the rock-shaft S, and each arm has a pawl $l$ engaging an adjacent ratchet-wheel. An arm W is attached also to the rock-shaft S and extends into the path of the end of the trip-arm Q to be intermittently engaged thereby during the rotation of the wheel P, which with the mechanism above described will cause the seeds to be measured and dropped into the seed-guides.

In order to accurately drop the seeds for hills without scattering the seeds, separate dropping apparatus is provided comprising two arms X and $X'$, that are secured to the rock-shaft S, two arms Y, pivoted at ends thereof to the seed-guides N and $N'$, and two gates Z, that are mounted at the bottoms of the seed-guides and connected to the opposite or free ends of the arms Y. A stiff spring $m$ forms a yielding link connection between each arm X or $X'$ and an arm Y, and a relatively weak spring $n$ connects each arm Y with the frame H by means of a bracket $p$ for retracting the arms Y to open the gates and also for retracting the arm W and the arms X and $X'$. It will be seen that when the arm W is moved forwardly by the trip-arm Q the gates Z will quickly close, and then the spring $m$ will permit the arm W to move farther, so as to rotate the seed-plates sufficiently to drop the seeds into the seed-guides to be momentarily held by the gates. After the arm W is released by the trip-arm Q passing beyond it the spring $n$ will retract the connections and open the seed-gates suddenly, suitable stops of course being provided for gaging the amount of travel of the rock-shaft and arms carried thereby.

It will be understood that the diameter of the wheel P will be about one foot for planting in hills three feet apart, and it is designed that the wheels P and $P'$ and the disks R and $R'$ shall run into the soil sufficiently deep to open furrows into which the seeds may be planted.

In practical use horses are to be hitched to the machine, and when on highways the lever I may be drawn backwardly to elevate the frame carrying the wheels P $P'$ and the disks above the ground. When beginning to plant a row of corn for hills in check-row order, the wheel P is to be turned by hand, while the machine is at rest until seed for a hill is dropped at the desired spot. Then the machine may proceed across the field, the wheel P, while assisting in opening a furrow or trench, measuring the distances for the hills and causing the seeds to be dropped at the desired uniform distances apart, which is accomplished by reason of the wheel entering the soil at all times and not dropping into low spots nor rising over lumps or high spots on the ground, and the wheel may be forced to enter the ground more or less by manipulating the lever I, as will be understood. The wheels $a$ and $a'$ follow, as usual, and cover the seeds in the furrows. While the wheel P rotates once in each revolution thereof the trip-arm Q will engage the arm W, the gates thereby being closed in advance of the movement of a full pocket $g$ of seeds to the aperture $h$ in the seedbox-bottom, so that the seeds when they fall into the channel $h'$ will be stopped by the gates Z and held momentarily, so as to bunch them, after which they will be dropped all together. When it is desired to drill the seeds, the gates and their connections may be removed, and additional trip-arms Q may be applied, so as to operate the seed-plates as often as may be desired.

Having thus described the invention, what is claimed as new is—

1. A corn-planter including a seedbox, a seed-guide connected with the seedbox, a rock-shaft provided with an operating-arm, a rotative measuring-wheel provided with means for intermittently moving the operating-arm, a dished disk mounted rotatively adjacent to the measuring-wheel and having its axis inclined to the axis of the measuring-wheel, a seed-dropper, and mechanism connected with the rock-shaft and also with the seed-dropper for the operation of the seed-dropper.

2. A corn-planter including a seedbox, a seed-guide connected with the seedbox and having a wheel and also a dished disk mounted thereon, a rock-shaft provided with an operating-arm, means carried by the wheel for intermittently moving the operating-arm, and seed-dropping mechanism provided with a spring-retracted operating-arm connected operatively with the rock-shaft.

3. A corn-planter including a seedbox, a seed-guide connected with the seedbox and having a wheel and also a dished disk mounted thereon with different axes, a rock-shaft provided with an operating-arm, means carried by the wheel for intermittently moving the operating-arm, a seed-measuring device connected with the seedbox, a seed-dropper mounted on the seed-guide, operating mechanism connected with the seed-measuring device and also with the rock-shaft, and operating mechanism connected with the seed-dropper and also with the rock-shaft.

4. A corn-planter including a frame, a plurality of seedboxes mounted on the frame, seed-measuring apparatus connected with the seedboxes, seed-guides connected with the seedboxes and having each a wheel and a dished disk mounted thereon at opposite sides thereof, a rock-shaft mounted on the frame and provided with an operating-arm, means carried by one of the wheels for intermittently engaging and moving the operating-arm, seed-gates mounted on the seed-ing-arm, seed-gates mounted on the seed-guides between the wheels and the dished disks and having spring-retracted operating-arms connected operatively with the rock-shaft, connections between the rock-shaft and the seed-measuring apparatus, and carrying-wheels supporting the frame.

5. A corn-planter including a plurality of seedboxes, seed-plates in the seedboxes, gear-wheels attached to the seed-plates, seed-guides attached to the seedboxes and having each a wheel and a dished disk mounted thereon, a rock-shaft provided with an operating-arm, means carried by one of the wheels for intermittently engaging and moving the operating-arm, gear-wheels having ratchet-wheels attached thereto mounted rotatively on the rock-shaft and meshing with the gear-wheels of the seed-plates, pawls carried by the rock-shaft in engagement with the ratchet-wheels, and seed-gates mounted on the seed-guides and having spring-retracted operating-arms connected operatively with the rock-shaft.

6. The combination, with a plurality of seedboxes and seed-plates therein for measuring and delivering the seeds, seed-guides to receive the seeds, and gates to temporarily hold the seeds in the seed-guides, of dished disks mounted on the seed-guides, wheels mounted on the seed-guides and coöperating with the disks to open furrows, one of the wheels carrying a trip-arm, a rock-shaft having an arm extending into the path of the trip-arm, and connections between the rock-shaft and the seed-plates and also the gates.

In testimony whereof I affix my signature in presence of two witnesses.

SOLOMON GRANT LOHR.

Witnesses:
ROBERT M. WILLIAMSON,
DAVID J. McMATH.